(12) United States Patent
Feldkhun (10) Patent No.: US 9,684,076 B1
(45) Date of Patent: Jun. 20, 2017

(54) FREQUENCY MULTIPLEXED RANGING

(71) Applicant: Daniel Feldkhun, Boulder, CO (US)

(72) Inventor: Daniel Feldkhun, Boulder, CO (US)

(73) Assignee: Daniel Feldkhun, Boulder, CO (US)

( * ) Notice: Subject to any disclaimer, the term of this patent is extended or adjusted under 35 U.S.C. 154(b) by 565 days.

(21) Appl. No.: 14/211,488

(22) Filed: Mar. 14, 2014

Related U.S. Application Data

(60) Provisional application No. 61/791,544, filed on Mar. 15, 2013.

(51) Int. Cl.
*G01S 17/89* (2006.01)

(52) U.S. Cl.
CPC .................... *G01S 17/89* (2013.01)

(58) Field of Classification Search
CPC ............. G01C 3/08; G01J 1/42; G01N 21/55
See application file for complete search history.

(56) References Cited

U.S. PATENT DOCUMENTS

| | | | |
|---|---|---|---|
| 5,070,483 A * | 12/1991 | Berni | G01H 9/00 356/28.5 |
| 5,552,893 A | 9/1996 | Akasu | |
| 7,532,311 B2 | 5/2009 | Henderson et al. | |
| 8,184,279 B2 | 5/2012 | Feldkhun | |
| 8,384,907 B2 | 2/2013 | Tearney et al. | |
| 8,558,993 B2 | 10/2013 | Newbury et al. | |
| 8,558,998 B2 | 10/2013 | Feldkhun et al. | |
| 2004/0213463 A1 | 10/2004 | Morrison | |
| 2009/0059201 A1 | 3/2009 | Willner et al. | |
| 2010/0182587 A1 | 7/2010 | Fluckiger | |
| 2012/0038903 A1 * | 2/2012 | Weimer | G01C 3/08 356/4.07 |

* cited by examiner

*Primary Examiner* — Luke Ratcliffe
(74) *Attorney, Agent, or Firm* — Cooley LLP (57) ABSTRACT

Methods, systems, and apparatuses are provided for measuring and mapping ranges, reflectivities, and/or velocities of multiple locations on an object by illuminating the locations with uniquely frequency-encoded sensing beams, which may be generated using one or more acousto-optic devices. A detector is used to sense the interference of the sensing beams reflected from the object and one or more reference beams, which may be co-propagating with the sensing beams to/from the object and/or may be provided via a separate reference path. A processor is used to estimate lateral coordinates, ranges, reflectivities, and/or velocities of the illuminated locations based on the frequencies, phases, amplitudes, and Doppler shifts, respectively, of the corresponding spectral components of the temporal beat signal produced by the detector in response to the interference of the sensing and reference beams. The processor may also disambiguate the range at each measured location using a pair of closely-spaced spectral components.

19 Claims, 3 Drawing Sheets

FREQUENCY MULTIPLEXED RANGING

CROSS-REFERENCE TO RELATED APPLICATION(S)

This application claims the benefit under 35 U.S.C. 119(e) of U.S. Provisional Patent Application Ser. No. 61/791,544, entitled "HETERODYNE FREQUENCY-MULTIPLEXED ACOUSTO-OPTIC RANGING" filed Mar. 15, 2013, the entire disclosure of which is incorporated herein by reference for all purposes.

BACKGROUND

Laser-based time-of-flight (TOF) ranging, sometimes referred to as LIDAR or LADAR, may be used to obtain a three-dimensional (3D) representation and in some cases to measure motion of an object or a scene in a variety of applications including but not limited to robotic navigation and mapping, spacecraft and aerial vehicle landing and positioning systems, remote target identification and tracking, surveying, and atmospheric remote sensing. Some existing TOF systems may measure the range at multiple locations by illuminating the object or scene with a temporally-modulated or pulsed laser beam spatially scanned using galvanic mirrors and utilizing a time-resolving detector to sense the round-trip propagation time with respect to an optical and/or electronic reference. Alternatively, a TOF technique sometimes referred to as Flash LIDAR may illuminate the object or scene with wide-area laser light or an array of laser beams and use an active pixel detector array to measure the round-trip time of light reflected from multiple locations in parallel, making it possible to capture a reflectivity image and a range map simultaneously without scanning Additionally, TOF systems may estimate line-of-sight object velocities at the measured locations from the Doppler frequency shift of the respective detected laser beams.

SUMMARY

Typically, the measurement speed of scanned TOF systems may be limited to tens of thousands of points per second due to mechanical scanning. With state-of-the-art Flash LIDAR systems utilizing video-rate 128×128 active pixel arrays without moving parts, it may be possible to measure nearly a million points per second. However, even Flash LIDAR may be several orders of magnitude too slow for applications requiring high-resolution dense range measurements of dynamic scenes. Moreover, some high-speed applications may require a programmable ranging system capable of measuring a sparse subset of locations tailored to the specific object or scene to more efficiently utilize the available laser power. There is thus a need for tools and techniques which may enable high-throughput, high-resolution, dynamically-reconfigurable multiple-point ranging and velocimetry.

Embodiments of the present invention thus provide frequency-multiplexed ranging tools and techniques that may address these needs. Some embodiments provide methods for estimating a range to at least one location in a plurality of locations on an object. A plurality of sensing beams may be produced. Each sensing beam in the plurality of sensing beams may have a distinct radio frequency shift with respect to the other sensing beams in the plurality of sensing beams. A plurality of locations on the object may be illuminated with the plurality of sensing beams and may reflect and/or scatter respective portions of the plurality of sensing beams so as to form a plurality of reflected beams. Interference of a reference beam with at least one reflected beam in the plurality of reflected beams may be detected with a detector to produce a temporal beat signal comprising a plurality of spectral components. Each spectral component in the plurality of spectral components may correspond to a respective location in the plurality of locations. The range to the at least one location in the plurality of locations may be estimated based at least in part on a phase of the corresponding spectral component in the plurality of spectral components of the temporal beat signal. The methods may also include estimating a reflectivity of at least one location in the plurality of locations based at least in part on an amplitude of the corresponding spectral component. Furthermore, the methods may include estimating at least one lateral coordinate of the at least one location in the plurality of locations based at least in part on a frequency of the corresponding spectral component.

In some embodiments the methods may also include modulating a laser beam with at least one acousto-optic device so as to produce at least one sensing beam in the plurality of sensing beams. The methods may also include driving the at least one acousto-optic device with a drive signal comprising the distinct radio frequency shifts so as to produce the plurality of sensing beams. Furthermore, in some embodiments the at least one acousto-optic device may comprise a first acousto-optic device and a second acousto-optic device in optical communication with the first acousto-optic device, and the methods may include driving the first acousto-optic device so as to produce a one-dimensional array of one or more sensing beams from the laser beam, and driving the second acousto-optic device so as to produce a two-dimensional array of one or more sensing beams from the one-dimensional array of sensing beams. In some embodiments the at least one acousto-optic device may have an access time T and the methods may further include estimating a frequency of the corresponding spectral component to a resolution finer than about 1/T, and estimating at least one lateral coordinate of the at least one location in the plurality of locations based at least in part on the frequency of the corresponding spectral component.

In some embodiments the interference between the reference beam and each reflected beam in the plurality of reflected beams may be detected simultaneously. The methods may also include disambiguating the range based on a difference in frequency of a pair of spectral components in the plurality of spectral components, the pair of spectral components corresponding to a pair of locations in the plurality of locations.

Some embodiments provide systems for estimating a range to at least one location in a plurality of locations on an object. A sensing beam generator may produce a plurality of sensing beams. Each sensing beam in the plurality of sensing beams may have a distinct radio frequency shift with respect to the other sensing beams in the plurality of sensing beams. A detector may produce a temporal beat signal based on interference of a reference beam with at least one reflected beam in a plurality of reflected beams formed by illuminating the plurality of locations on the object with the plurality of sensing beams. The temporal beat signal may comprise a plurality of spectral components, with each spectral component in the plurality of spectral components corresponding to a respective location in the plurality of locations. A processor, operably coupled to the detector, may be used to estimate the range to the at least one location from a phase of the corresponding spectral component. In some embodiments, the processor may be further configured to estimate a reflectivity of at least one location in the plurality of locations based at least in part on an amplitude of the corresponding spectral component. Furthermore, the processor may also estimate at least one lateral coordinate of the at least one location in the plurality of locations based at least in part on a frequency of the corresponding spectral component.

In some embodiments, the sensing beam generator may comprise at least one acousto-optic device to modulate a laser beam so as to produce at least one sensing beam in the plurality of sensing beams. Furthermore, the at least one acousto-optic device may be driven with a drive signal comprising the distinct radio frequency shifts so as to produce the plurality of sensing beams.

In some embodiments the systems may include a detector configured to simultaneously detect interference between the reference beam and each reflected beam in the plurality of reflected beams. The systems may also include a processor configured to disambiguate the range based on a difference in frequency of the spectral components corresponding to a pair of locations in the plurality of locations.

Some embodiments provide methods for generating a range map of an object. At least one frequency-shifted beam may be produced with an acousto-optic device. A plurality of locations may be illuminated with the at least one sensing beam. The plurality of locations on the object may reflect and/or scatter respective portions of the plurality of sensing beams so as to form at least one reflected beams. Interference of a reference beam and the at least one reflected beams may be detected with a detector to produce a temporal beat signal comprising a plurality of spectral components. Each spectral component in the plurality of spectral components may correspond to a respective location in the plurality of locations. At least one lateral coordinate of at least one location in the plurality of locations may be estimated based at least in part on a frequency of the corresponding spectral component in the plurality of spectral components of the temporal beat signal. A range to the at least one location may be estimated from a phase of the corresponding spectral component in the plurality of spectral components of the temporal beat signal. The coordinate and range estimates may be used to generate a range map. Furthermore, the methods may include estimating a reflectivity of the at least one location based at least in part on an amplitude of the corresponding spectral component.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

This description provides example embodiments only, and is not intended to limit the scope, applicability, or configuration of the disclosed technology. Rather, the ensuing description of the embodiments will provide those skilled in the art with an enabling description for implementing embodiments of the disclosed technology. Various changes may be made in the function and arrangement of elements without departing from the spirit and scope of the disclosed technology.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may occur before, after, or concurrently with the following embodiments.

Figure 1:
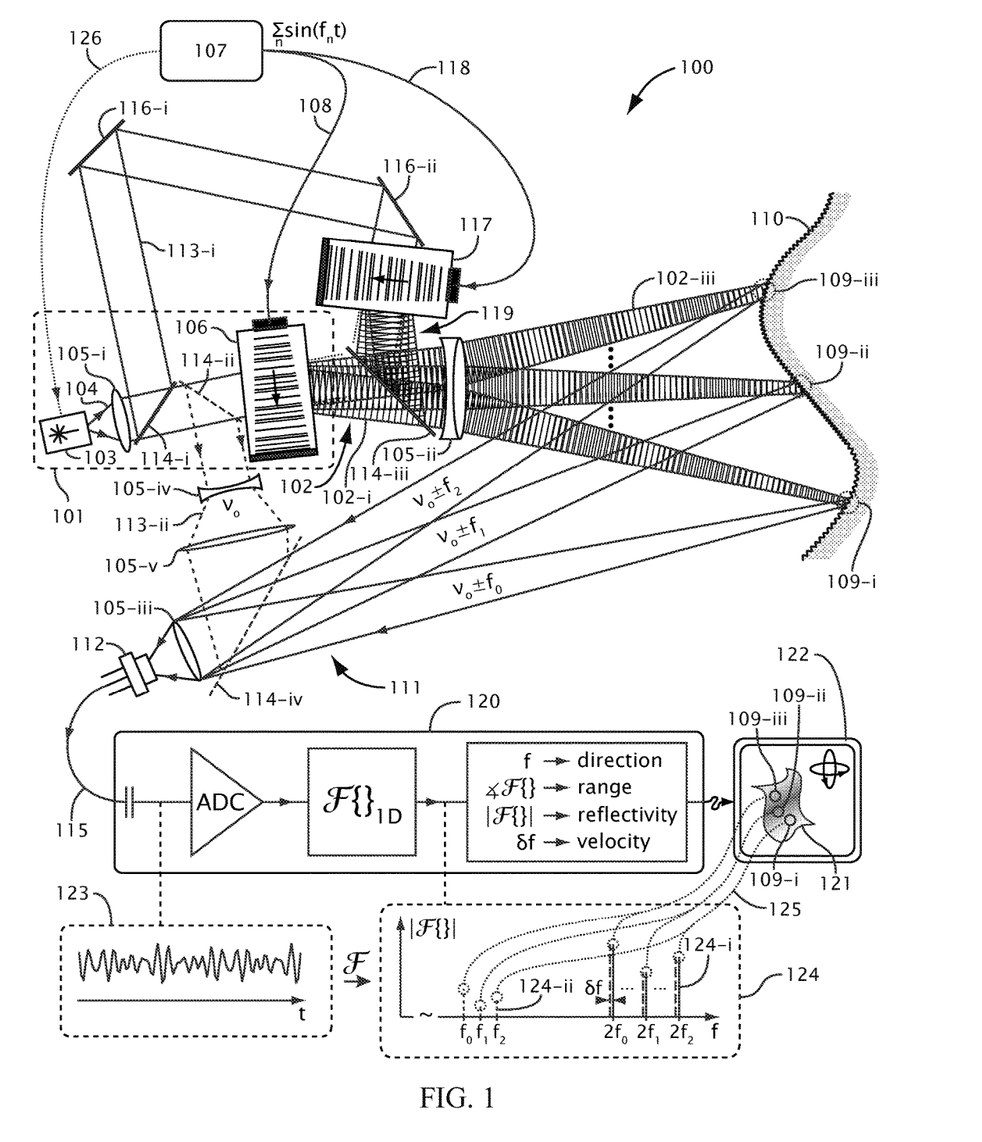
FIG. 1 illustrates a frequency multiplexed ranging system utilizing an acousto-optic Bragg cell to generate a one-dimensional frequency-encoded array of sensing beams. The arrayed sensing beams are reflected from corresponding locations on an object and interfere with one or more local and/or co-propagating reference beams at a detector to produce a frequency-encoded temporal beat signal. A processor is used to decompose the beat signal into its frequency components, to establish a map between the frequency components and the corresponding object locations, and to compute ranges, reflectivities, and/or line-of-sight velocities at the illuminated locations from the phases, amplitudes, and Doppler shifts, respectively, of the corresponding frequency components.

FIG. 1 illustrates a frequency multiplexed ranging system 100 in accordance with various embodiments. In system 100, a sensing beam generator 101 may produce a plurality of frequency-shifted sensing beams 102, with each sensing beam having a distinct frequency shift with respect to the other sensing beams. In some embodiments the sensing beam generator 101 may comprise a laser 103 producing a source radiation 104 with an optical frequency $v_0$. The source radiation 104 may be collimated with a lens 105-$i$ and may illuminate an acousto-optic Bragg cell 106. A controller 107 may drive the Bragg cell 106 with a signal 108 comprising distinct frequencies, such as frequencies $f_1$, $f_2$, and $f_3$, each drive frequency component causing the Bragg cell 106 to diffract a distinct sensing beam 102-$i$ at an angle proportional to the drive frequency and to impart a corresponding Doppler frequency shift onto the diffracted beam 102-$i$ via the acousto-optic interaction, as may be understood by those skilled in the art. A lens 105-$ii$ may be used to illuminate a plurality of locations, such as locations 109-$i$, 109-$ii$ and 109-$iii$, with the plurality of frequency-shifted sensing beams, such as beam 102-$iii$, on an object 110 being measured. The sensing beams may be reflected and/or scattered by the object 110 to produce reflected beams 111. The reflected beams may be collected using a lens 105-$iii$ onto a single-element detector 112, such as an avalanche photodiode (APD) or a photomultiplier tube (PMT), merely by way of example. Additionally, one or more coherent reference beams, such as beams 113-$i$ and 113-$ii$, may be split-off from the source radiation 104 using a beam splitter, such as beam splitters 114-$i$ and 114-$ii$. The one or more reference beams may be directed onto the detector 112 and may interfere with one or more of the reflected beams 111, to produce a temporal beat signal 115.

In some embodiments, a reference beam 113-$i$ may be directed using mirrors 116-$i$ and 116-$ii$ onto an acousto-optic Bragg cell 117 driven by the controller 107 with a signal 118 comprising distinct frequencies to diffract an array of frequency-shifted reference beams 119. In some embodiments Bragg cell 117 and signal 118 may be substantially identical to Brag cell 106 and signal 108, however the two Bragg cells may be oriented to impart oppositely-directed frequency shifts onto the diffracted beams 119 (i.e. one may be up-shifting, and the other down-shifting, or vice-versa). The diffracted reference beams 119 may then be combined with the diffracted sensing beams 102 using a beam splitter 114-$iii$ so that the illumination and reference beams are substantially co-propagating to and from the object 110, forming a common-path interferometer.

In some embodiments, a reference beam 113-$ii$ may be directed onto the detector via a separate local optical path comprising beam splitters 114-$ii$ and 114-$iv$, and lenses 105-$iv$ and 105-$v$, without incidence on the object 110. The lenses 105-$iv$ and 105-$v$ may be used to cause the reference beam 113-$ii$ to converge at the detector so as to match the span of the angles of incidence of the reflected beams 111 and provide a substantially uniform temporal beat signal strength as a function of angle. In some embodiments both a local reference beam 113-$ii$ and co-propagating reference beams 119 may be utilized.

A processor 120 in electrical communication with the detector may be used to create a 3D map 121 of the range and reflectivity of the object, which may be displayed on a screen 122. As part of computing the range/reflectivity map 121, the processor may filter the temporal beat signal 115 to produce an AC-coupled temporal signal 123, which may then be digitized and Fourier-transformed to obtain its radio-frequency (RF) spectrum with amplitudes 124. The RF spectrum may comprise frequencies spanning the range from DC to many GHz and may be chosen to match the bandwidths of the acousto-optic devices and/or the detector used. For instance, the acousto-optic devices may be driven with RF signals that include spectral components at 10 MHz, 25 MHz, 50 MHz, 75 MHz, 100 MHz, 150 MHz, 200 MHz, 250 MHz, 500 MHz, 1 GHz, 1.5 GHz, 2 GHz, and so on. These RF signals may impart RF shifts on the sensing beams of 10 MHz, 25 MHz, 50 MHz, 75 MHz, 100 MHz, 150 MHz, 200 MHz, 250 MHz, 500 MHz, 1 GHz, 1.5 GHz, 2 GHz, and so on. Typical $TeO_2$ slow shear mode acousto-optic devices may have bandwidths and may enable RF shifts spanning the range from tens to hundreds of MHz. Moreover, the laser 103 may be synchronously modulated to down-shift the beat frequencies to accommodate a low-bandwidth detector, resulting in an RF spectrum with spectral components at low frequencies such as 20 KHz, merely by way of example.

In embodiments utilizing multiple reference beams 119 co-propagating with the reflected sensing beams 102, the interference at the detector 112 of the $n^{th}$ reflected sensing beam frequency-shifted by $f_n$ with its corresponding reference beam frequency-shifted by $-f_n$ may produce a temporal beat signal component at a frequency of $2f_n$. Therefore, a mapping 125 between a Fourier component, such as component 124-$i$, and a corresponding illuminated location on the object 109-$i$ may be established. An estimate of the reflectivity at the illuminated location 109-$i$ may be obtained from the amplitude of the Fourier component 124-$i$, whereas the range from the sensing beam generator 101 to the illuminated location 109-$i$ may be computed from the unwrapped phase of the Fourier component 124-$i$. Within an unambiguous range span $z_n$ corresponding to half of the beat period $v_0/4f_n$ where $v_0$ is the speed of light in the medium, the incremental range $\delta z_n$ may be computed as $\delta z_n = v_0/4f_n * \phi_n/2\pi$, where $\phi_n$ is the measured phase of the $n^{th}$ Fourier component 124-$i$. The phase $\phi_n$ may be unwrapped and the range disambiguated using a lower synthetic beat frequency as described in FIG. 3. With a typical beat frequency $2f_n \approx 100$ MHz and a phase resolution $\Delta\phi_n \approx 2\pi/100$, a range resolution $\Delta z_n \approx 15$ mm may be obtained within an unambiguous range of 150 cm, merely by way of example. In some common-path embodiments utilizing multiple reference beams 109, unwanted interference between a reference beam and reflected sensing beams from multiple locations may produce coincident temporal beat frequencies, resulting in cross-channel interference (i.e. cross-talk) and a non-unique mapping 125. However, cross-talk may be suppressed as a result of spatial integration on the surface of the detector 112 of interference patterns due to beams with a mutual angular separation. Furthermore, cross-talk may be mitigated by driving the Bragg cells 106 and 117 using a non-periodic signal with a varying inter-frequency spacing.

In embodiments utilizing a local reference beam 113-$ii$, the interference between the reference beam with an optical frequency $v_0$ and the $n^{th}$ reflected sensing beam with a shifted frequency of $v_0+f_n$ may produce a temporal beat signal component at $f_n$. Therefore, a mapping 125 between a Fourier component, such as component 124-$ii$, and a corresponding illuminated location on the object 109-$i$ may be established. An estimate of the reflectivity at the illuminated location 109-$i$ may be obtained from the amplitude of the Fourier component 124-$ii$, whereas the range from the sensing beam generator 101 to the illuminated location 109-$i$ may be computed from the unwrapped phase of the Fourier component 124-$ii$. Unlike common-path embodiments, due to the fixed object-independent local reference beam path, the phase of the Fourier component 124-*ii* may be interferometrically sensitive to variations in the position of the object and/or the illumination optical path by just a small fraction of the optical wavelength. Hence such local reference path embodiments may be most suitable for high-stability close-range interferometric measurements. Moreover since only a small fraction (about 1/TB in the 1D case, where TB is the time-bandwidth product of the Bragg cell) of the reference beam 113-*ii* may contribute to the spatially-integrated interferometric beat signal for any given reflected sensing beam, whereas the shot noise may be due to the full detected optical power, a much stronger reference beam 113-*ii* may be required to attain a sufficiently-low-noise measurement than in the common-path multiple-reference-beam embodiments described above, especially in the case of spatially-sparse measurements.

In some embodiments, a line-of-sight velocity of each illuminated location towards or away from the sensing beam generator 101 may be determined from a measured Doppler shift $\delta f_n$ of the corresponding Fourier component relative to the expected beat frequency $f_n$ or $2f_n$. In embodiments utilizing a local reference beam 113-*ii* the measured Doppler shift may be given by $\delta f_n = v_0 * \Delta v_n / v_0$, where $v_0$ is the speed of light in the medium, $\Delta v_n$ is the velocity of the nth spot relative to the sensing beam generator 101, and $v_0$ is the optical frequency. Thus, the Doppler shift can easily exceed the frequency comb spacing—for example, a relative velocity of 10 m/s may generate a Doppler shift of 16 MHz. In embodiments utilizing common-path reference beams, such as beams 119, on the other hand, the measured Doppler shift may be given by $\delta f_n = 2f_n * \Delta v_n / v_0$, producing a frequency shift of only 3.3 Hz for a 10 m/s motion, which may require a long measurement time (on the order of 1 second) to resolve. Therefore in some embodiments it may be advantageous to utilize both a local reference beam, such as beam 113-*ii*, and one or more common-path reference beams, such as beams 119, producing Fourier components at $f_n$ and $2f_n$, respectively to enable measurement of slow and fast velocities, respectively, while simultaneously offering mm-scale and interferometric range resolutions.

In some embodiments multiple locations such as locations 119-*i*, 119-*ii*, and 119-*iii*, on the object 110 may be illuminated by the corresponding frequency-shifted sensing beams producing a plurality of detector signal Fourier components such as component 124-*i* simultaneously. In some embodiments the locations may be illuminated with a sequence of sensing beams by driving Bragg cells 106 and in some embodiments 117 with a swept-frequency drive signal. In some embodiments the frequency sweep may be discretized and in some embodiments the sensing beams may be pulsed. Such parallel and sequential embodiments may each be advantageous in different scenarios. For example, sequential measurements may produce a higher SNR when measuring objects with bright point-like features, whereas for extended objects with more uniform reflectivity parallel measurements may have a noise advantage. Moreover, parallel measurements may be advantageous for measuring certain dynamic scenes using a bright source 103, where the measurement speed may be limited by the acousto-optic access time rather than the photon budget. In some embodiments a combination of parallel and sequential measurements may be utilized (for example, several regions on the object may be scanned in parallel using system 100).

In some embodiments, the frequency multiplexed ranging system 100 may be reconfigured using the electronic signals 108 and/or 118 driving the Bragg cells 106 and/or 117 to probe different sets of locations on the object in parallel and/or sequentially based on information about the scene or measurement requirements. For example, the number and arrangement of sensing beams may be electronically reconfigured to trade off sensitivity (and range resolution) for spatial resolution—a sparse array of sensing beams may be brighter and may produce stronger modulation at the detector than a dense array of sensing beams. The system may be reconfigured before or during the range map acquisition process. For example, computed range maps or images of a changing scene may be utilized to adaptively reconfigure the sensing beam array to optimize a metric such as SNR, measurement speed, or target recognition fidelity for subsequent measurements. In some embodiments, the strengths of the illumination and/or reference beams at specific locations on the object 110 may be controlled using the amplitudes of the corresponding spectral components of the Bragg cell drive signal 108 and/or 118 to improve SNR and range resolution at the specific locations. The sensing beams 102 (and/or reference beams 119) may be reconfigured electronically with high agility without moving parts during the time taken by the acoustic wave in the Bragg cell 106 (and/or 119) to propagate across the optical beam 104, which may be known to some as the acousto-optic (AO) access time $t_a$, and may be on the order of 20 μs for a typical Bragg cell utilizing a slow shear mode $TeO_2$ crystal. Furthermore, in some embodiments the phases of individual illumination and/or reference beams may be adjusted via the Bragg cell drive signals to calibrate optical path geometry and systematic errors, to compensate for unwanted in-line motion, or for range disambiguation, for example. In some embodiments the time needed to adjust the phases of the beams may be less than the AO access time $t_a$.

In some embodiments utilizing a one-dimensional (1D) acousto-optic Bragg cell 106 to generate a 1D array of sensing beams 102, the number of resolvable locations on the object may be limited by the product of the access time $t_a$ and bandwidth of the Bragg cell, known to some as the time-bandwidth product TB. For a typical slow-shear $TeO_2$ Bragg cell with a 50 MHz bandwidth, a TB≈1000 may be attained with commercial off-the-shelf devices, enabling parallel or sequential measurement of ~1000 locations across the field of view. The measurement speed of the system 100 may depend on various factors. When illumination photons are abundant, the measurement time needed to resolve the frequency components in the RF power spectrum 124 may be limited by the AO access time $t_a$ (e.g. ~20 μs), making it possible to measure ~50 million locations per second (since ~1000 locations may be measured at once), which may be over three orders of magnitude faster than typical mechanically-scanned LIDAR speeds. While a measurement duration of $t_a$ may be just long enough to resolve the frequencies $f_n$, (which may be separated by ~50 KHz, for example) in practice longer measurements may be desirable to attain better range resolution and/or to resolve small Doppler shifts for velocity measurements (e.g. with a 1s measurement time, a 1 Hz Doppler shift may be resolved). As described above, the range resolution for the $n^{th}$ sensing beam in common-path embodiments may be estimated as $\Delta z_n = v_0 / 4f_n * \Delta \phi_n / 2\pi$ and is proportional to the phase resolution $\Delta \phi_n$, which in turn depends on the SNR within the corresponding spectral bin and in the shot noise limited regime may vary with the square root of the measurement time.

It should be apparent to those skilled in the art that FIG. 1 represents just one of many possible embodiments of the invention. Although FIG. 1 shows an acousto-optic Bragg-cell 106 generating the frequency-shifted sensing beams 102, the sensing beam generator 101 may employ other means for generating an array of frequency-shifted beams, such as a reflecting surface-acoustic wave device or an array of individual frequency modulators, merely by way of example. Similarly, co-propagating frequency-shifted reference beams 119 may be generated by other means. In some embodiments, the illumination and reference beams may be generated as up-shifting and down-shifting diffraction orders from a single acousto-optic device 106 and may be optically redirected to coincide. In some embodiments the acousto-optic devices 106 and 117 may have different characteristics and may be driven with differently-spaced and/or shifted frequency comb signals 108 and 118 to produce co-propagating illumination and reference beams. In such embodiments the beat frequencies may be different than $2f_n$.

In some embodiments the beams 102 and 119 may propagate to the far field and may illuminate distinct locations such as locations 109-i, 109-ii, and 109-iii on the object 110 without the use of a projecting lens 105-ii. The reference beams 113-i and 113-ii may be sampled, shaped, and directed using other optical means than the beam splitters 114-i and 114-ii, mirrors 116-i and 116-ii, and lenses 105-iv and 105-v shown. For example, in some embodiments the light source 103 may be fiber-coupled and the reference beams may be produced using fiber optic splitters and routed using fibers. In some embodiments a reference beam 113-ii may be much stronger than the reflected sensing beams 111 to reduce heterodyne detection noise. In some embodiments, the undiffracted $0^{th}$ order beam emerging from the Bragg cell 106 may be used as a reference beam.

The detector 112 may comprise a photodiode, and APD, a PMT, or another type of detector capable of temporally resolving the interference between the reference and reflected sensing beams. In some embodiments the light source 103 may be modulated synchronously with respect to the Bragg cell drive signal 108 using signal 126 to down-convert the temporal beat signal to a lower frequency range resolvable with a slower detector such as a pixel of a camera, merely by way of example. In some embodiments multiple detectors may be utilized in parallel to capture reflected beams from different regions of the object, to increase the effective dynamic range, to cover different wavelength regimes, and/or to provide redundancy. The source radiation 104 may have a wavelength in the visible, infra-red, ultra-violet, or other wavelength regimes where suitable detectors are available. In some embodiments the reflected beams 111 may propagate back along the illumination direction and the detector 112 may be positioned in close proximity to the beam generator 101 and may detect the reflected beams via a beam splitter. In embodiments where the sensing beams are reflected and detected off-axis, a calibration measurement using a known reference target may be utilized to compensate for off-axis range map distortions as well as other systematic errors.

In some embodiments the processor 120 may not need to filter, digitize, and/or Fourier-transform the signal to obtain the range and reflectivity map. For example, in embodiments employing sequential scanning using a chirped drive signal 108, the amplitude and phase of the resulting chirped beat signal 115 may be recovered using a Hilbert transform or may be demodulated using analog circuitry. Conversely, additional processing steps may be necessary. For example, in processing a digitized chirped signal using a Fourier transform, a de-chirping step may be necessary to remove a quadratic phase factor due to the frequency chirp.

Figure 2:
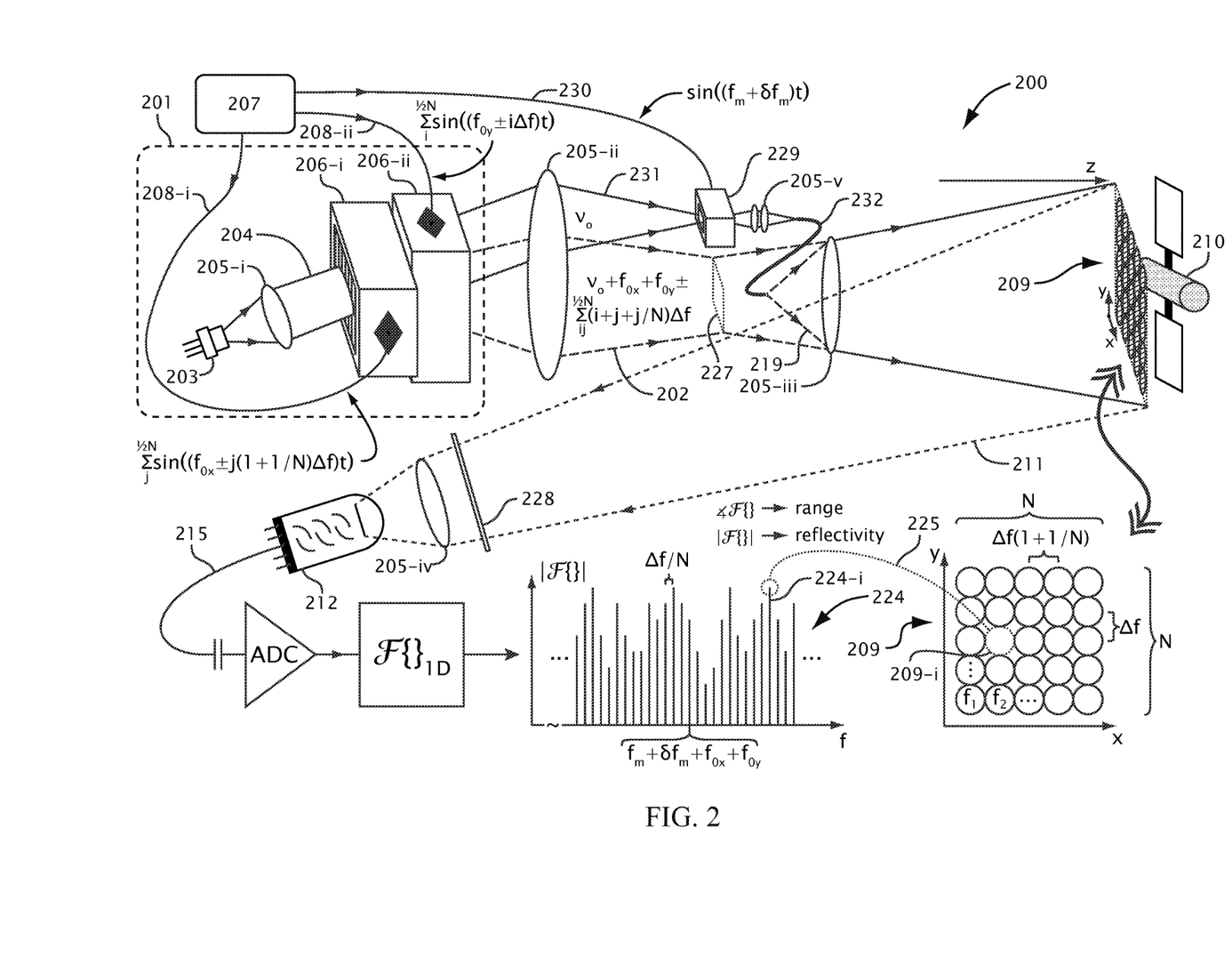
FIG. 2 illustrates a rastered frequency multiplexed ranging system utilizing a cascaded pair of orthogonal acousto-optic Bragg cell to generate a two-dimensional frequency-encoded array of sensing beams. The arrayed sensing beams are reflected from corresponding locations on an object and interfere with a co-propagating frequency-shifted reference beam at a detector to produce a frequency-encoded temporal beat signal. A processor is used to decompose the beat signal into its frequency components, to establish a map between the frequency components and the corresponding object locations, and to compute ranges, reflectivities, and/or line-of-sight velocities at the illuminated locations from the phases, amplitudes, and Doppler shifts, respectively, of the corresponding frequency components.

FIG. 2 illustrates a rastered frequency multiplexed ranging system 200 in accordance with various embodiments. In system 200, a sensing beam generator 201 may produce a two-dimensional (2D) array of frequency-shifted sensing beams 202 with each sensing beam having a distinct frequency shift with respect to the other sensing beams. In some embodiments the sensing beam generator 201 may comprise a laser 203 producing a source radiation 204 with an optical frequency $v_0$. The source radiation 204 may be collimated with a lens 205-i and may illuminate a cascaded pair of orthogonal acousto-optic Bragg cells 206-i and 206-ii. A controller 207 may drive the Bragg cells 206-i and 206-ii with signals 208-i and 208-ii comprising distinct frequencies. Each drive frequency component of signal 208-i may cause the first Bragg cell 206-i to diffract a distinct beam at an angle in an x-z plane proportional to the drive frequency and to impart a corresponding Doppler frequency shift onto the diffracted beam, producing a one-dimensional (1D) array of diffracted beams incident on the second Bragg cell 206-ii. Each drive frequency component of signal 208-ii may cause the second Bragg cell 206-ii to diffract a distinct 1D beam array at an angle in a y-z plane proportional to the drive frequency and to impart a corresponding Doppler frequency shift onto the diffracted 1D beam array, so as to produce a frequency-encoded 2D sensing beam array 202. A lens 205-ii may be used to focus the sensing beams at an intermediate Fourier plane 227 and another lens 205-iii may image the Fourier plane 227 onto an object 210, thereby illuminating a plurality of locations 209 in a field of view (FOV) on the object 210 with the plurality of frequency-shifted sensing beams 202. The sensing beams may be reflected and/or scattered by the object 210 to produce reflected beams 211. The reflected beams may pass through an ambient light rejection filter 228 and may be collected using a lens 205-iv onto a single-element detector 212, such as an avalanche photodiode (APD) or a photomultiplier tube (PMT), merely by way of example. Additionally, the controller 207 may drive an acousto-optic modulator (AOM) 229 with a signal 230 to impart a small frequency shift $\delta f_m$ onto an undiffracted $0^{th}$ order beam 231 passing through the cascaded Bragg cells 206-i and 206-ii to produce a frequency-shifted reference beam 219, which may be coupled into a fiber 231 using lenses 205-v. The lens 205-iii may be used to partially collimate the output of the fiber 232 so as to illuminate the FOV with the reference beam 219. The reference beam 219 may be reflected or scattered by the object 210 along with the sensing beams 202 and may interfere with one or more of the reflected sensing beams 211 at the detector to produce a temporal beat signal 215.

As in FIG. 1, a processor in electrical communication with the detector 212 may filter, digitize, and Fourier-transform the temporal beat signal 215 to obtain its RF spectrum with amplitudes 224, establish a mapping 225 between the frequency of a Fourier component 224-i and the corresponding sensing beam and illuminated location 209-i on the object 210, and compute range, reflectivity, and/or velocity at the location from the amplitude, unwrapped phase, and Doppler shift of the corresponding Fourier component. In some embodiments the spacing between frequency components of the drive signals 208-i and 208-ii may be chosen to be slightly different from each other so as to generate a raster mapping between the x and y coordinates of an illuminated location 209-i and the 1D comb of Fourier components 224. For an N×N array of sensing beams, for example, the spacing ratio may be 1+1/N, resulting in a nearly rectangular sensing beam array and a regularly-spaced (but sparse, especially near the edges) comb 224 of Fourier components centered at the sum of the Bragg cell center frequencies and the reference beam modulation frequency $f_{0x}+f_{0y}+(f_m+\delta f_m)$ with a grid spacing of $\Delta f/N$ (where $\Delta f$ may correspond to the frequency spacing in the drive signal 208-ii). The reference beam frequency shift $f_m+\delta f_m$ imparted by the AOM 229 may be used to incrementally shift the entire Fourier comb 224 to help unwrap the phase and disambiguate the range for each Fourier component 224-i by synthesizing a lower beat frequency as described in FIG. 3.

As in FIG. 1, the object locations 209 may be measured sequentially and/or in parallel and the frequencies and amplitudes of the drive signals 208-i and 208-ii may be controlled to strike an optimum balance between measurement speed, lateral resolution, and range resolution and/or to adapt the system for the scene or task at hand. In some parallel sensing embodiments where the limit on measurement speed may be the acousto-optic access time $t_a$ rather than the photon budget, it may be possible to measure $N^2$ locations simultaneously and to resolve the corresponding beat frequencies during a measurement time of $Nt_a$. For $TeO_2$ Bragg cells with $TB \approx 1000$ and $t_a \approx 20$ μs this may correspond to a measurement speed of ~50 million locations per second, which may be nearly two orders of magnitude faster than speeds attainable with state-of-the 128×128 active pixel Flash LIDAR arrays, for example. Moreover, whereas Flash LIDAR techniques may rely on custom high-cost active pixel arrays, the systems of FIG. 1 and FIG. 2 may utilize off-the-shelf lasers, acousto-optics, and general-purpose detectors available to operate for various wavelength regimes.

It should be apparent to those skilled in the art that FIG. 2 represents just one of many possible embodiments of the invention. The various embodiments of FIG. 1 described in the context of a 1D acousto-optically generated sensing beam array may also be employed with cascaded orthogonal Bragg cells and a 2D sensing beam array of FIG. 2. In some embodiments the cascaded Bragg cells 206-i and 206-ii may be positioned in conjugate image planes of an optical system instead of adjacent to each other as shown. The intermediate Fourier plane 227 and lens 205-iii merely exemplify an optical system used to deliver the illumination and reference beams to the object. Instead, a single lens 205-ii may be used as in FIG. 1 or the beams may propagate to a far-field object without using any lenses, for example. Instead of comprising an undiffracted $0^{th}$ order beam, the reference beam 231 may be split off from the source radiation beam 204 using a beam splitter as in FIG. 1, or may be derived from another part of the optical system. Instead of using a fiber 232, in some embodiments a beam splitter or a small mirror may be used to couple the reference beam into the illumination path.

In some embodiments the signals 208-i and 208-ii driving the two orthogonal Bragg cells 206-i and 206-ii may each have a different number of frequency components resulting in an M×N array of sensing beams. Moreover, the frequency spacings and offsets of the Bragg cell drive signals may be different than shown in the figure and described in the examples and may produce non-uniformly spaced components of the Fourier comb 224. In some embodiments the orientations of the Bragg cells and/or the AOM may be chosen to shift the frequencies of the incident beams downward instead of upward, causing the Fourier comb 224 to have a smaller frequency offset (e.g. $f_{0x}+f_{0y}-f_m-\delta f_m$) than shown in FIG. 2, which may be advantageous depending on the resolution and unambiguous range desired and on the bandwidth of the detector. In some embodiments the sensing beam frequencies may be shifted using the Bragg cells 206-i and/or 206-ii instead of shifting the frequency of the reference beam using the AOM 229 to generate synthetic frequencies for range disambiguation, and the AOM may be omitted. While this may result in a lateral displacement of the illuminated locations 209, the displacement may be small compared to the array spacing and may be insignificant for the measurement.

Figure 3:
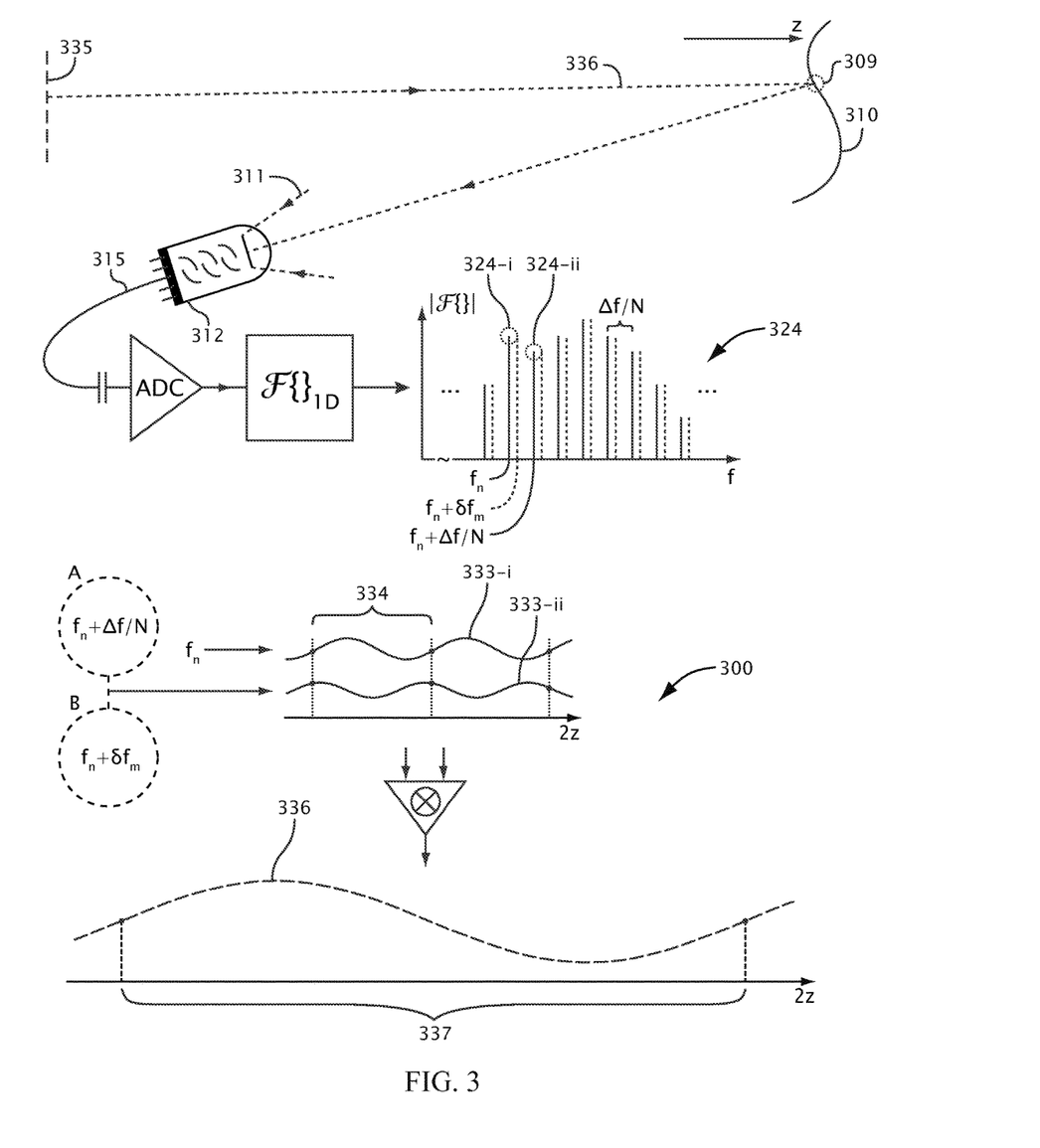
FIG. 3 illustrates a method 300 for disambiguating frequency multiplexed range measurements using a low-frequency waveform synthesized from a pair of detected Fourier components closely spaced in frequency. The two Fourier components may correspond to nearby locations on the object or may be generated by imparting a small frequency shift on the reference or sensing beams.

FIG. 3 illustrates a method 300 for disambiguating frequency multiplexed range measurements. In the method 300, a detector 312 may produce a temporal beat signal 315 proportional to the interference of frequency-encoded reflected illumination and reference beams. Fourier-transforming this temporal beat signal 315 may produce an RF spectrum with amplitudes 324, where each Fourier component may be mapped to a distinct illuminated location on the object 310 and a range to the location may be computed from the phase of the corresponding Fourier component, as described in FIG. 1 and FIG. 2.

Due to the periodicity of each Fourier component of the beat signal 315, such as component 333-i with an amplitude 324-i, the range may be determined unambiguously from the phase of the sinusoid 333-i with a frequency $f_n$ only within a single period 334. This single period 334 may correspond to an unambiguous range span $z_n \approx v_0/2f_n$, (assuming the sensing beams are reflected and detected on-axis), where $v_0$ is the speed of light in the medium. In order to estimate the absolute range from a plane of reference 335 at the sensing beam generator to an illuminated location 309, it may be necessary to be able to determine the number of periods 334 produced during the time that the sensing beam takes to propagate along the path 336 from the plane of reference 335 to the illuminated location 309 and back to the detector 312. Thus the task of disambiguating the range may be considered as a task of unwrapping the phase of the waveform 333-i.

In some embodiments, phase unwrapping and range disambiguation may be accomplished by generating a synthetic beat waveform 336 from a pair of Fourier components 333-i and 333-ii which may have closely spaced frequencies $f_n$ and $f_n'$, respectively. In some embodiments, the waveform 336 may be synthesized by multiplying waveforms 333-i and 333-ii, merely by way of example, and may have a frequency $f_b=|f_n-f_n'|$. Since for a small $f_b$ the period 337 of the synthetic waveform 336 may be much larger than the period 334 of a Fourier component 333-i of the beat signal, the phase of the synthetic waveform 336 may be used to unwrap the phase of the waveform 333-i (assuming the relative phases of the waveforms 333-i and 333-ii are known at a fixed reference time).

In some embodiments, which may be referred to as differential ranging, waveforms 333-i and 333-ii may comprise a pair of neighboring Fourier components with amplitudes 324-i and 324-ii acquired during a single measurement and corresponding to neighboring illuminated locations on the object 310 with a small or unresolvable range difference. For example, for a pair of neighboring Fourier components with frequencies $f_n=100$ MHz and $f_n'=f_n+\Delta f/N=101$ MHz (as shown in Inset A) the unambiguous range for Fourier component 333-i without phase unwrapping may be $z_n \approx v_0/2f_n \approx 1.5$ m. However by utilizing a synthetic beat frequency with $f_b=\Delta f/N=1$ MHz to unwrap the measured phase (for example, by utilizing the ratio $f_n/f_b$ to estimate the number of periods 334 elapsed during the sensing beam round-trip time from the phase of waveform 336), the unambiguous range span may be extended to 150 m, while maintaining a 15 mm range resolution (assuming a phase measurement resolution of $\Delta\phi_n \approx 2\pi/100$).

In some embodiments, the waveform 333-*ii* may instead be generated by imparting a small frequency shift $\delta f_m$ onto the reference beam or the sensing beam in a subsequent measurement as described in FIG. 2 and depicted in Inset B of FIG. 3. The resulting synthetic waveform 336 may have a larger period 337 (providing a longer unambiguous range span) than possible with differential ranging and may be generated for each illuminated location independently of its neighbors. However, unlike differential ranging, two sequential measurements may be required to generate a synthetic beat and disambiguate the range.

It should be apparent to those skilled in the art that FIG. 3 represents just one of many possible embodiments of the invention. The Fourier components 333-*i* and 333-*ii* used for differential ranging may be neighboring in Fourier space (as shown by amplitudes 324-*i* and 324-*ii*) or may be separated by one or more comb lines. While the synthetic beat waveform 336 may be a useful construct in understanding phase unwrapping and range disambiguation, some embodiments may not need to actually synthesize such a waveform to disambiguate range. Merely by way of example, range may be disambiguated by using phase measurements for two neighboring Fourier components to find the nearest match in a lookup table storing all possible phase combinations for the two frequencies and the corresponding range values. Moreover, a variety of other techniques which may be known to those skilled in the art of Phase Shifting Interferometry (PSI) may be used to unwrap the phase and disambiguate range. For example, in some embodiments range may be disambiguated by generating a narrow sweep of the reference beam frequency and comparing the timing of the drive signal and resulting detector signal chirps.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

It will be recognized by those of skill in the art that various modifications, alternative constructions, and equivalents may be used without departing from the spirit of the disclosed technology. By way of example, several such variations are set forth here, but this identification of potential variations is not intended to be exhaustive, and other variations will be evident for those of skill in the art.

For instance, while the optics have been described for particular types of systems in the illustrative embodiments, the principles of the disclosed technology may more generally be implemented with reflective optics, transmissive optics, or combinations thereof.

The arrangements illustrated in the drawings and described above are simple so that the principles of operation will be evident, but it will be appreciated that other systems may be implemented in a more complex fashion, such as by involving a greater number of lenses than shown and/or by involving additional conjugate optical planes. The lenses are illustrated merely by a way of an example and may represent other optical systems, which may include but are not limited to lenses, mirrors, prisms, beam splitters, gratings, gradient index lenses, diffractive lenses, or waveguides.

Although a single detector array has been described above for most embodiments, it will be understood that parallelized embodiments using multiple detector groups or arrays to look at different parts of the object, different spectral bands, different polarizations, etc. are also within the intended scope of the disclosed technology, and may be used in various embodiments where only a single detector array has been described. Moreover, the detector arrays may be located in a Fourier plane of the imaging optics rather than in the image plane, or in any other location allowing images of the object to be computed.

In some illustrative embodiments, only a pair of interfering beams has been shown, but the same principles typically also apply when many beams or when a continuous spatially modulated wavefront is diffracted. Such alternative embodiments are also within the intended scope of the disclosed technology.

In addition, the above elements may merely be a component of a larger system, wherein other rules may take precedence over or otherwise modify the application of the disclosed technology. Also, a number of steps may be undertaken before, during, or after the above elements are considered.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the coupling structures and diffractive optical elements disclosed herein may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes (e.g., of designing and making the coupling structures and diffractive optical elements disclosed above) outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

Accordingly, the above description should not be taken as limiting the scope of the disclosed technology, which is defined in the following claims.

What is claimed is:

1. A method for estimating a range to at least one location in a plurality of locations on an object, the method comprising:
   (A) producing a plurality of sensing beams, each sensing beam in the plurality of sensing beams having a distinct radio frequency shift with respect to the other sensing beams in the plurality of sensing beams;
   (B) illuminating the plurality of locations on the object with the plurality of sensing beams produced in (A) so as to establish a correspondence between at least one of the distinct radio frequency shifts and at least one of the plurality of locations, the plurality of locations on the object reflecting and/or scattering respective portions of the plurality of sensing beams so as to form a plurality of reflected beams;
   (C) detecting, with a detector, interference of a reference beam with at least one reflected beam in the plurality of reflected beams formed in (B) so as to produce a temporal beat signal;
   (D) decomposing the temporal beat signal into a plurality of spectral components, each spectral component in the plurality of spectral components corresponding to a respective location in the plurality of locations; and
   (E) estimating the range to the at least one location in the plurality of locations based at least in part on a phase of the corresponding spectral component in the plurality of spectral components of the temporal beat signal.

2. The method of claim 1, further comprising:
   estimating a reflectivity of at least one location in the plurality of locations based at least in part on an amplitude of the corresponding spectral component.

3. The method of claim 1, further comprising:
   estimating at least one lateral coordinate of the at least one location in the plurality of locations based at least in part on a frequency of the corresponding spectral component.

4. The method of claim 1, wherein (A) further comprises:
   modulating a laser beam with at least one acousto-optic device so as to produce at least one sensing beam in the plurality of sensing beams.

5. The method of claim 4, wherein (A) further comprises:
   driving the at least one acousto-optic device with a drive signal so as to produce the plurality of sensing beams at the distinct radio frequency shifts.

6. The method of claim 4, wherein the at least one acousto-optic device comprises a first acousto-optic device and a second acousto-optic device in optical communication with the first acousto-optic device, and wherein (A) further comprises:
   driving the first acousto-optic device so as to deflect the laser beam in a first dimension in order to form a first sensing beam in the plurality of sensing beams; and
   driving the second acousto-optic device so as to deflect the first sensing beam in a second dimension.

7. The method of claim 1, wherein (C) comprises simultaneously detecting each reflected beam in the plurality of reflected beams.

8. The method of claim 1, further comprising:
   disambiguating the range based on a difference in frequency of a pair of spectral components in the plurality of spectral components, the pair of spectral components corresponding to a pair of locations in the plurality of locations.

9. An apparatus for estimating a range to at least one location in a plurality of locations on an object, the apparatus comprising:
   a sensing beam generator to produce a plurality of sensing beams, each sensing beam in the plurality of sensing beams having a distinct radio frequency shift with respect to the other sensing beams in the plurality of sensing beams;
   a detector to produce a temporal beat signal based on interference of a reference beam with at least one reflected beam in a plurality of reflected beams, the plurality of reflected beams formed by illuminating the plurality of locations on the object with the plurality of sensing beams so as to establish a correspondence between at least one of the distinct radio frequency shifts and at least one of the plurality of locations; and
   a processor, operably coupled to the detector, to decompose the temporal beat signal into a plurality of spectral components, each spectral component in the plurality of spectral components corresponding to a respective location in the plurality of locations, and to estimate the range to the at least one location from a phase of the corresponding spectral component.

10. The apparatus of claim 9, wherein the processor is further configured to estimate a reflectivity of at least one location in the plurality of locations based at least in part on an amplitude of the corresponding spectral component.

11. The apparatus of claim 9, wherein the processor is further configured to estimate at least one lateral coordinate of the at least one location in the plurality of locations based at least in part on a frequency of the corresponding spectral component.

12. The apparatus of claim 9, wherein the sensing beam generator comprises:

at least one acousto-optic device to modulate a laser beam so as to produce at least one sensing beam in the plurality of sensing beams.

13. The apparatus of claim 12, wherein the at least one acousto-optic device is driven with a drive signal so as to produce the plurality of sensing beams at the distinct radio frequency shifts.

14. The apparatus of claim 12, wherein the at least one acousto-optic device comprises:
   a first acousto-optic device driven so as to deflect the laser beam in a first dimension in order to form a first sensing beam in the plurality of sensing beams; and
   a second acousto-optic device driven so as to deflect the first sensing beam in a second dimension.

15. The apparatus of claim 9, wherein the detector is configured to simultaneously detect each reflected beam in the plurality of reflected beams.

16. The apparatus of claim 9, wherein the processor is further configured to disambiguate the range based on a difference in frequency of the spectral components corresponding to a pair of locations in the plurality of locations.

17. A method for generating a range map of an object, the method comprising:
   (A) producing at least one frequency-shifted beam with an acousto-optic device;
   (B) illuminating a plurality of locations with the at least one sensing beam produced in (A), the plurality of locations on the object reflecting and/or scattering respective portions of the plurality of sensing beams so as to form at least one reflected beams;
   (C) detecting, with a detector, interference of a reference beam and the at least one reflected beams formed in (B) so as to produce a temporal beat signal comprising a plurality of spectral components, each spectral component in the plurality of spectral components corresponding to a respective location in the plurality of locations; and
   (D) estimating at least one lateral coordinate of at least one location in the plurality of locations based at least in part on a frequency of the corresponding spectral component in the plurality of spectral components of the temporal beat signal produced in (C);
   (E) estimating a range to the at least one location from a phase of the corresponding spectral component in the plurality of spectral components of the temporal beat signal produced in (C); and
   (F) generating the range map based on the at least one lateral coordinate estimated in (D) and the range estimated in (E).

18. The method of claim 17, further comprising:
   estimating a reflectivity of the at least one location based at least in part on an amplitude of the corresponding spectral component.

19. A method for estimating a velocity of at least one location in a plurality of locations on an object, the method comprising:
   producing a plurality of sensing beams, each sensing beam in the plurality of sensing beams having a distinct radio frequency shift with respect to the other sensing beams in the plurality of sensing beams;
   illuminating the plurality of locations on the object with the plurality of sensing beams so as to establish a correspondence between at least one of the distinct radio frequency shifts and at least one of the plurality of locations, the plurality of locations on the object reflecting and/or scattering respective portions of the plurality of sensing beams so as to form a plurality of reflected beams;
   detecting, with a detector, interference of a reference beam with at least one reflected beam in the plurality of reflected beams so as to produce a temporal beat signal;
   decomposing the temporal beat signal into a plurality of spectral components, each spectral component in the plurality of spectral components corresponding to a respective location in the plurality of locations; and
   estimating the velocity of the at least one location in the plurality of locations based at least in part on a frequency shift of the corresponding spectral component in the plurality of spectral components of the temporal beat signal.

* * * * *